US006551647B1

(12) United States Patent
Lelli

(10) Patent No.: US 6,551,647 B1
(45) Date of Patent: Apr. 22, 2003

(54) ICE-CREAM CONFECTIONERY PRODUCT AND METHOD FOR ITS PREPARATION

(75) Inventor: Angelo Lelli, Alba (IT)

(73) Assignee: Soremartec S.A., Schoppach-Arlon (BE)

( * ) Notice: Subject to any disclaimer, the term of this patent is extended or adjusted under 35 U.S.C. 154(b) by 325 days.

(21) Appl. No.: 09/624,048

(22) Filed: Jul. 24, 2000

(30) Foreign Application Priority Data

Jul. 26, 1999 (EP) .............................................. 99830476

(51) Int. Cl.$^7$ ................................................. A23G 9/02
(52) U.S. Cl. ........................ 426/565; 426/577; 426/660
(58) Field of Search ................................ 426/660, 565, 426/577

(56) References Cited

U.S. PATENT DOCUMENTS

| | | | |
|---|---|---|---|
| 2,590,077 A | | 3/1952 | Lolkema et al. ............... 99/136 |
| 4,140,807 A | * | 2/1979 | Braverman .................. 426/573 |
| 4,251,560 A | | 2/1981 | Dell et al. .................... 426/525 |
| 4,264,637 A | | 4/1981 | Braverman .................. 426/573 |
| 4,335,155 A | | 6/1982 | Blake et al. |
| 4,368,211 A | | 1/1983 | Blake et al. .................. 426/565 |
| 4,725,445 A | | 2/1988 | Ferrero ........................ 426/565 |
| 5,171,602 A | * | 12/1992 | Martin et al. ................ 426/567 |
| 5,753,288 A | * | 5/1998 | Ogawa ......................... 426/100 |
| 5,900,268 A | | 5/1999 | Mazoyer et al. ............. 426/654 |
| 6,423,359 B1 | * | 7/2002 | Braverman .................. 426/565 |

FOREIGN PATENT DOCUMENTS

| | | | |
|---|---|---|---|
| EP | 0 0301 440 | * | 2/1989 |
| EP | 0521707 | | 1/1993 |
| EP | 0598920 | | 6/1994 |
| FR | 1217873 | | 5/1960 |
| FR | 2359581 | | 2/1978 |
| FR | 2387605 | | 11/1978 |
| WO | 9404046 | | 3/1994 |

\* cited by examiner

*Primary Examiner*—Nina Bhat
(74) *Attorney, Agent, or Firm*—Rothwell, Figg, Ernst & Manbeck

(57) ABSTRACT

An ice-cream confectionery product in the form of an emulsion stable in the liquid state at ambient temperature, preservable at ambient temperature in the said liquid state when packaged in sterile conditions and having a microcrystalline structure upon freezing in the absence of beating, comprising alimentary fats, milk proteins, sweeteners, flavorings and water, further comprising a thickening and stabilizing composition comprising a salt acting as a protein stabilizer, a hydrocolloid constituted by a chemically modified starch and at least one further hydrocolloid chosen from water soluble hemicellulose, pectins having a high degree of esterification and mixtures thereof.

15 Claims, No Drawings

ICE-CREAM CONFECTIONERY PRODUCT AND METHOD FOR ITS PREPARATION

The present invention relates to a fluid food composition capable of being preserved for an extended period of time in the liquid state and intended, before consumption, to be frozen in a refrigerator, even one for domestic use, to give an ice-cream product ready for consumption.

Ice-cream is a food composition comprising milk, cream or water, sweetening agents, flavourings, binding agents and emulsifying agents, which is brought to the solid or semi-solid state by freezing. In the preparation of ice-cream by industrial freezers or by means of devices for domestic use, the ice-cream mix, or rather the food composition on which the ice-cream is based, is subjected to agitation and beating under intense refrigeration for the purpose of causing the incorporation of air into the composition before or during freezing. Thanks to the presence of small air bubbles the ice-cream melts rapidly in the consumer's mouth giving a pleasant sensation of freshness and at the same time avoiding any unpleasant and excessive cooling of the mouth and teeth.

Industrial ice-cream is typically sold in a form ready for consumption or rather is preserved in a packaged form or in bulk under refrigeration and is removed from the refrigerated environment before being consumed. This involves the necessity for refrigerated transport both in the industrial distribution chain and on the part of the consumer after having acquired it; the possible liquefaction during transport involves a substantial loss of the organoleptic properties in that the subsequent freezing effected after a partial accidental unfreezing or liquefaction involves an unacceptable increase in the consistency.

The present invention therefore relates to a food composition which has the nutritional and organoleptic characteristics typical of conventional ice-cream, but is capable of being distributed to the consumer normally in the liquid state to be consumed after having been frozen in a normal domestic refrigerator in static cooling and freezing conditions; the product according to the invention, when frozen, even in the absence of mechanical beating to cause the incorporation of air and whipping of the product, has a substantially homogenous non-aerated microcrystalline structure without any crystals of ice perceptible to the consumer. Another peculiarity of the product to which the invention relates is the possibility of being subject to repeated cycles of freezing and liquefaction without this altering the possibility of obtaining a microcrystalline structure following final freezing.

A product of the above type is described in EP-A-0 192 753 the description of which is incorporated in the present specification by reference. The composition in the above-cited document utilises a stabilising and thickening composition comprising a salt acting as protein stabiliser, an alginate with gelling properties and a thickening agent constituted by a chemically modified starch. The procedure for preparation and use of the said stabilising composition aims at obtaining a liquid emulsion having a low viscosity in that it has been established that a low viscosity facilities the formation of the desired microcrystalline structure in the frozen product.

Even though the product described in the above mentioned patent has the desired structural characteristics upon freezing, the object of the present invention is that of providing a further improvement particularly in relation to the properties of flavour development and palatability upon consumption.

Other studies and researches carried out by the applicant have in fact established the possibility that in products conforming to EP-A-0 192 753, during the course of static freezing, an undesirable precipitation of the flavouring ingredients may take place which detrimentally affects the perceptible development of the flavour when the product is consumed.

The formation of micro-crystals of ice in static freezing conditions is in fact strongly conditioned by the composition of the superconcentrated solution from which they originate; all flavourings form part of such solutions with associated solvents and/or dispersants; the solubility ratio of the flavourings at the low temperatures of freezing (down to −24° C.) are very much more critical than at ambient temperature; if the competition from other solutions (carbohydrates-salts minerals-proteins) is added it will be understood that in the course of static freezing precipitation of the flavourings can occur due to supersaturation and segregation thereof in the structure of the frozen product. This risk of precipitation of the flavourings obviously does not occur in the production of industrial ice-creams in that the freezing takes place in dynamic conditions in continuous freezers in which intense agitation avoids local conditions of supersaturation.

The possibility of uniformly distributing the non-freezable part, of which the flavourings are a part integrated with the solutions present, onto the surface of all the micro-crystals as they are created, gives a rise, on the other hand, to an extraordinary flavour development during the melting phase, not otherwise obtainable with that type of product and with the same flavourings.

The problem of local supersaturation of the flavourings could on the one hand be resolved, at least in part, by increasing the quantities of solvents for such flavourings; however, since food solvents for such flavourings are principally alcoholic solvents, their use in excess of the minimum quantities necessary to put the flavourings into solution is generally undesirable.

According to another aspect it has been determined that products of the type described in EP-A-0 192 753 are normally subjected to freezing at temperatures which vary from −8° C. to −24° C.; for the purpose of achieving the best organoleptic and palatability characteristics for the consumer it is preferable that, after removal of the product from the refrigerator, it be maintained at ambient temperature for a certain period of time which varies as a function of the refrigeration temperature, but which is generally between 5 and 10 minutes. This waiting time is generally necessary to achieve the best characteristics of creaminess to the palate corresponding to the palatability of a conventional industrial ice-cream. In this respect, a further object of the present invention is that of providing an improved product which makes it possible to achieve the desired palatability characteristics after a shorter waiting time at ambient temperatures.

In view of these objects and others which will become apparent from the following description, the subject of the present invention is a confectionery ice-cream product in the form of a stable emulsion, preferably of the oil-in-water type, which is in a liquid state at ambient temperature, preservable at ambient temperature in the said state when packaged in sterile conditions and having a microcrystalline structure following freezing, even in the absence of beating or whipping, comprising alimentary fats, milk proteins, sweeteners, flavourings and water, characterised in that it further includes a thickening and stabilising composition comprising a salt acting as a protein stabiliser, a hydrocolloid constituted by a chemically modified starch and at least one further hydrocolloid chosen from water soluble hemicelluloses, pectins with emulsifying properties having a high degree of esterification and their mixtures.

A water soluble hemicellulose, suitable for the present invention, derived from oil seeds and cereals, is described in EP-A-0 521 707 as a food additive for acidic and non-acidic protein products and for baked products. Its main sugar constituents are rhamnose, fucose, arabinose, xylose, galactose, glucose and uronic acid and it has an average molecular weight from 50,000 to 1,000,000, preferably from 100,000 to 400,000 and can be obtained by degradation of water-insoluble vegetable fibres containing protein in acid conditions preferably around the isoelectric point of the protein and at a temperature of 100 to 130° C. The process for preparation of the hemicellulose described in the above-cited document is incorporated herein by reference. A water soluble hemicellulose of soya, particularly derived from soybean cotyledons mainly containing dietetic fibres of soya (about 60–70% by weight) is described in EP-A-0 598 920 (incorporated herein by reference) as an emulsifier.

A commercial product is available from Fuji Oil Company under the commercial name SOYAFIBE™.

The pectins having a high degree of esterification or HM pectin utilised according to the invention are chemically defined as polygalacturonic acids the carboxylic groups of which are esterified with methyl alcohol in amounts greater than 50% and preferable greater than 70%.

Of particular interest are depolymerised HM pectins obtained from citrus fruits and apples having emulsifying properties, such as described in FR-A-2 745 980; such pectins have a molecular weight less than 80,000 dalton and preferably between 10,000 and 50,000 dalton.

The composition according to the invention can optionally comprise, in combination with the above mentioned ingredients, pectins having a high degree of esterification with a molecular weight greater than 150,000 dalton. Such pectins, which typically have thickening/stabilising properties, can be utilised in combination with hemicellulose preferably in a ratio by weight of 1:1 to 1:1.5 with respect to the hemicellulose.

The product according to the invention preferably has an alimentary fat content between 5 and 25% by weight referred to the weight of the emulsion, more preferably a content of from 10 to 18% by weight which is the typical content of alimentary fats in the products defined as ices or properly as ice-cream. The fat phase of the emulsion can be constituted either by butyric fats or by a mixture of butyric fats and vegetable fats. The introduction of butyric fats is preferably obtained by the use of whole milk and milk cream respectively in the region of 20 to 45% by weight and from 15 to 40% by weight referred to the weight of the emulsion. However, the desired proportion of butyric fats could be obtained also by using cow's milk butter. The whole milk constitutes an important element of the emulsion in that it acts both as a solvent for dissolving the dry parts and as a basic element for the state change. Moreover the milk which constitutes the continuous phase of the emulsion, which as mentioned is preferably of the oil-in-water type, contributes to the supply of proteins and lactose present in the emulsion; also the milk cream contributes to the fat phase, and to the protein and the lactose content, integrates the aqueous phase and moreover acts as a flavour contributing element. Naturally, the proportion of fats in the emulsion will have to be regulated by means of the addition of water to the emulsion itself. In the case of the use of vegetable fats, these are preferably chosen from oils having a melting point from 30 to 36° C. such as, for example, cocoa oil, palm oil and palm-kernel oil. Among these the use of fractionated cocoa oil, or rather the high melting fraction of the cocoa oil is preferred mainly due to its organoleptic characteristics. In this case the ratio by weight between butyric fats and vegetable fats is preferably maintained at a value from 1:1 to 2:1. The protein content is preferably between 1 and 8% by weight referred to the weight of the emulsion, preferably between 1 and 5% by weight.

As well as lactose in the emulsion there is also generally present a suitable added sugar as a sweetener, preferably chosen from saccharose and/or fructose. The use of fructose is particularly advantageous in that thanks to its low molecular weight it gives rise to a lowering of the freezing temperature of the emulsion. The desired proportion of sugar can be obtained also by means of the use of condensed milk, which contributes likewise to the protein content in the emulsion. The total quantity of sugars can be obviously chosen in such a way as to achieve the desired degree of sweetness, but typically is up to about 32% with respect to the weight of the emulsion; in the case of the use of fructose its quantity is generally in the region of from 3 to 10% referred to the weight of the emulsion.

Water soluble hemicellulose or HM pectin are typically utilised in quantities of from 0.05 to 3% by weight of the weight of the total emulsion, preferably from 0.1 to 0.3% by weight. The salt acting as protein stabiliser is preferably a disodium or dipotassium phosphate and is preferably utilised in quantities from 0.005 to 0.3% by weight, preferably from 0.01 to 0.02% by weight referred to the weight of the emulsion.

The chemically modified starch is preferably chosen from acetate starch preferably of the adipic cross linked type (starch n. 14) and di-starch phosphate preferably hydroxypropylate di-starch phosphate and is utilised in quantities of from 0.1 to 1.5% by weight referred to the weight of the emulsion.

With reference to 100 parts of modified starch, there are preferably present in the thickening/stabilising composition from 0.6 to 20 parts by weight of gellification-retarding salts and from 6 to 300 parts of water soluble hemicellulose or HM pectin.

The flavouring liquids and/or solids are utilised in quantities sufficient to impart the desired flavour; the flavourings can be introduced into the emulsion in solution in alcohol solvents used in the minimum quantities necessary to maintain the flavouring agent in solution.

The product according to the invention can be obtained from a process which preferably comprises the stages of:
a) preparing an emulsion, preferably of the oil-in-water type at a temperature from 50 to 65° C., comprising alimentary fats, milk proteins, sweeteners, stabilising and thickening agents and flavouring;
b) sterilizing the emulsion preferably at a temperature from 136 to 150° C. for a time from 15 to 0.5 seconds;
c) homogenising the sterilised emulsion at a temperature from 60 to 80° C. and at a pressure from 70 to 200 bar in such a way as to obtain a product having a viscosity not greater than 500 cPs (Brookfield DV2 plus, S1, 50 rpm, 20° C.); and
d) cooling the product thus obtained for subsequent packaging in sterile conditions.

The preparation of the emulsion of stage a) is preferably performed at a temperature of about 60° C. in such a way that the oil phase is liquid. The preparation is performed in an emulsifier, for example of the type having a rotating agitator turning at about 1,400 revolutions per minute according to conventional techniques for the preparation of emulsions. Into the emulsifier is introduced pre-heated milk at about 60° C., after which all the dry pre-mixed soluble parts are introduced. The fat when used as such is generally introduced last in the molten state.

Stage b) of sterilisation is preferably effected continuously by means of a scraped surface heat exchanger (S.S.H.E.). In this stage the emulsion is maintained at a temperature of 136 to 150° C. for a time from 15 to 0.5 seconds under a hydraulic pressure sufficient to prevent evaporation of the aqueous phase.

It is preferable to effect homogenisation upstream of the sterilisation stage b), conducted at a temperature from 55 to 65° C. at a pressure of 75 to 100 bar. For this homogenisation it is preferable to use a two stage homogeniser in the first stage of which the homogenisation is conducted at a pressure from 75 to 100 bar and in the second stage at a pressure from 25 to 30 bar.

After sterilisation the emulsion is rapidly cooled to the temperature of stage c) that is to say from 60 to 80° C. This cooling can be effected continuously with the use of an S.S.H.E. connected to the output of the sterilising S.S.H.E. The final homogenisation stage c) is effected under pressure from 70 to 200 bar. It is also preferable in this case to use a two stage homogeniser in which the first homogenisation stage is conducted at a pressure preferably from 100 to 150 bar and the second stage at a pressure from 20 to 50 bar. With the final homogenisation the viscosity of the emulsion is regulated to a value not greater than 500 cPs measured with a Brookfield DV2 plus viscosimeter with a rotor S1 rotating at 50 r.p.m. and at 20° C. Subsequent to the final homogenisation stage c) the emulsion is cooled by means of a cooling S.S.H.E. to a temperature from 10 to 30° C. and then supplied to a pressure tank in which it is maintained under slight agitation thereafter to be packaged in sterile conditions. Naturally all operations performed downstream of the sterilisation stage are performed in aseptic (sterile) conditions.

Preferably, in the final homogenisation stage the viscosity of the emulsion is regulated to a value less than 350 cPs measured in the same conditions as described above; thanks to the use of water soluble hemicellulose or HM pectin it is possible, however, and advantageous, to achieve a viscosity of the emulsion even less than the above-described value, and preferably lying between 50 and 250 cPs.

The product has a dry solid content preferably between 36 and 42% by weight.

The product is generally packaged in sterile containers which preferably have an internal volume of 50 to 100 ml, corresponding to a food portion; preferably the containers are of prismatic type with a flat base which constitutes the face having the greater surface area of the prism and with a low height typically around 2–4 cm; the dimensions of the container are chosen for the purpose of ensuring the most uniform possible cooling. Preferably the freezing is effected by placing the product in an environment at a temperature which is around 10–15° C. below the freezing temperature of the product itself for the purpose of ensuring an initial supercooling of the product. These conditions give the best characteristics as far as the microcrystalline structure is concerned, which thus is homogeneous and free from crystals of ice perceptible to the consumer.

The freezing point of the product is typically between −3 and −8° C., preferably between −3 and −6° C. The average dimensions of the crystals in the best conditions is in the range between 5 and 35 microns and in any case the maximum dimensions must not be greater than 150 microns so that the crystals are not perceptible in a disagreeable manner to the consumer. The time which it takes the product initially at −20° C. to melt when maintained at a temperature of 23° C. lies between 10 and 19 minutes. The product can be maintained in the liquid state for a period of time not less than 3 months after packaging and can be subjected to repeated cycles of freezing and liquefaction without prejudicially affecting the stability of the emulsion and/or the microcrystalline quality of the frozen product ready for consumption. It has been established that thanks to the use of water soluble hemicellulose or HM pectin it is possible to achieve a substantial reduction in the viscosity which, for the same composition as a product such as described in EP-A-0 192 753, is up to four times less and is thus preferably between 50 and 350 cPs (Brookfield DV2 plus device, S1 rotating at 50 r.p.m. and 20° C.). Furthermore, a substantial improvement is achieved in the palatal solubility and a reduction in the average dimensions crystals which can be up to 5–20 microns. With the use of water-soluble hemicellulose or HM pectin there is furthermore achieved in the cooling and freezing phase a low increase in the viscosity of the liquid fraction containing the non-freezable components with an increase in the concentration of the solutions and of the insoluble components. The combined use of water-soluble hemicellulose together with the previously-mentioned stabilising salt presumably causes a synergistic action preventing the formation of protein agglomeration.

EXAMPLE 1a

For the preparation of 100 kg of product an emulsion is prepared containing the following ingredients in percentages by weight indicated in the following table:

| INGREDIENTS | % IN PORTION | Theoretical Dry Solids |
| --- | --- | --- |
| Milk/Cream Mixture | 75.71 | 20.00 |
| Sugar | 16.00 | 16.00 |
| Condensed Milk | 6.00 | 4.70 |
| Powdered Skim Milk | 1.00 | 1.00 |
| Modified Starch No. 14 | 1.00 | 1.00 |
| Water Soluble Hemicellulose (Soyafibe SD A 100)* | 0.20 | 0.20 |
| Flavourings | 0.05 | 0.05 |
| Disodium Phosphate Salts ($Na_2HPO_4$) | 0.04 | 0.04 |
| Total | 100.00 | 42.99 |

*TM

For the preparation of the emulsion the whole milk is preheated to 60° C. and introduced into an emulsifier rotating at a speed of 14,000 r.p.m. The mixed soluble ingredients are then introduced into the emulsifier under agitation and the milk cream, previously preheated to bring the fat to the molten state, is added last.

The emulsion is then supplied continuously at a temperature of 60° C. to a two stage homogeniser and subjected to homogenisation in the first stage at a pressure of 80 bar and in the second stage at 25 bar. The homogenised emulsion is preheated in an S.S.H.E. up to 110° C. and then supplied to a second S.S.H.E. in which sterilisation is effected at a temperature of 148° C. for 6 seconds. The stream of sterilised emulsion is then pre-cooled to 80° C. in an S.S.H.E. and then subjected to the second phase of homogenisation in which, in a first stage, it is maintained at a pressure of 130 bar and in the second stage at a pressure of 25 bar. After cooling in an S.S.H.E. to a temperature of 35° C. the emulsion stream is supplied to a pressurised reservoir where it is maintained at a temperature of 15° C. for about 24 hours and subsequently packaged in sterile containers of 75 ml.

The product thus obtained has a viscosity of 70 to 90 cPs determined immediately after packaging with a Brookfield DV2 plus viscometer with S1 rotors turning at 50 r.p.m. and at 20° C.

The packages thus obtained are maintained at 20° C. for 15 days; determination of the viscosity effected after 15 days from packaging did not detect a perceptible increase in the viscosity of the product. After this period of time 20 containers of the product were placed in a freezer at a temperature of −25±1° C. and maintained for at least 24 hours.

After removal from the freezer an analysis of the dimensions of the crystals was made, which had an average dimension of 20 microns with a maximum value not greater than 150μ.

The product obtained was further subjected to tests for determination of the "droplet" time which is correlated to the so-called waiting time, or rather the time for which the product must be preferably maintained at ambient temperature after removal from the freezer for the purpose of obtaining the best characteristics of creaminess and palatability.

In tests relating to the determination of the droplet time trapezoidal containers containing 66±1 grams of product, after having been agitated, are placed in a freezer at a temperature of −25° C.±1° C. and maintained in the freezer for 21 hours.

The product removed from the freezer had a temperature of −22.5° C.±0.5° C.; the protective skin was removed and the content thus exposed was immediately positioned on a support with the base face of the prism disposed in a vertical plane, in an environment held at a temperature of 23° C.±1° C. The droplet time detected is the time elapsed between removal from the freezer until occurrence of the first droplet.

In the product forming the subject of the example the droplet time detected is about 12 minutes.

Comparative tests, effected with the use of a composition corresponding with that of Example 1 where, however, water soluble hemicellulose was substituted for an equal quantity by weight of alginate, detected a droplet time greater than about five minutes.

EXAMPLE 1b

The procedure of Example 1a was repeated by preparing an emulsion having the following compositions expressed in percentage by weight:

| INGREDIENTS | % IN PORTION | THEORETICAL DRY SOLIDS |
|---|---|---|
| Milk/Cream Mixture | 75.68 | 20.00 |
| Sugar | 16.00 | 16.00 |
| Condensed Milk | 6.00 | 4.70 |
| Skimmed Milk Powder | 1.00 | 1.00 |
| Modified Starch No. 14 | 1.00 | 1.00 |
| Water Soluble Hemicellulose (Soyafibe S DA100) | 0.08 | 0.08 |
| HM Pectine | 0.15 | 0.15 |
| Flavourings | 0.05 | 0.05 |
| Diosodium Phosphate Salt (Na$_2$HPO$_4$) | 0.04 | 0.04 |
| Total | 100.00 | 43.02 |

EXAMPLE 2a

The procedure of Example 1 was repeated preparing an emulsion having the following composition expressed in percentage by weight:

| INGREDIENTS | % IN DOSE | THEORETICAL DRY SOLIDS |
|---|---|---|
| Liquid Coffee | 45.03 | 2.00 |
| Sugar | 25.00 | 25.00 |
| Milk/Cream Mixture | 15.10 | 3.80 |
| Vegetable Fat | 10.00 | 10.00 |
| Milk Proteins | 3.50 | 3.50 |
| Modified Starch No. 14 | 1.00 | 1.00 |
| Water Soluble Hemicellulose (Soyfibe S DA100) | 0.13 | 0.13 |
| HM Pectin | 0.20 | 0.20 |
| Dusodium Phosphate salt (Na$_2$HPO$_4$) | 0.05 | 0.05 |
| Total | 100.00 | 45.68 |

EXAMPLE 2b

The procedure of Example 1 was repeated preparing an emulsion having the following composition expressed in percentage by weight:

| INGREDIENTS | % IN DOSE | THEORETICAL DRY SOLIDS |
|---|---|---|
| Liquid Coffee | 45.20 | 2.00 |
| Sugar | 25.00 | 25.00 |
| Milk/Cream Mixture | 15.15 | 3.80 |
| Vegetable Fat | 10.00 | 10.00 |
| Milk Protein | 3.50 | 3.50 |
| Modified Starch No. 14 | 1.00 | 1.00 |
| Water Soluble Hemicellulose (Soyafibe S DA100) | 0.10 | 0.10 |
| Disodium Phosphate Salt (NA$_2$HPO$_4$) | 0.05 | 0.05 |
| Total | 100.00 | 45.45 |

In all the preparations forming the subject of the above examples the product had the desired palatability characteristics and conformed to those detected in Example 1a.

What is claimed is:

1. An ice-cream confectionery product in the form of an emulsion which is stable in a liquid state at ambient temperature, preservable at ambient temperature in said liquid state when packaged in sterile conditions and having a microcrystalline structure following freezing in the absence of beating, comprising alimentary fats, milk protein, sweeteners, flavourings and water, further comprising a thickening and stabilising composition comprising a salt acting as a protein stabiliser, a hydrocolloid constituted by a chemically modified starch and at least one hydrocolloid.

2. A confectionery product according to claim 1, comprising from 5 to 25% by weight of alimentary fats, from 1 to 8% by weight of milk proteins and up to 32% by weight, of sweeteners.

3. A confectionery product according to claim 1, comprising from 0.05 to 3% by weight of the said water soluble hemicellulose or pectin having a high degree of esterification or a mixture thereof.

4. A confectionery product according to claim 1, wherein the said water soluble hemicellulose has an average molecular weight between 100,000 and 400,000 and is a product obtainable by degradation of vegetable fibres containing proteins, not water-soluble in acid conditions.

5. A confectionery product according to claim 1, wherein said pectin has a degree of esterification not less than 70%.

6. A confectionery product according to claim 1, wherein the said salt acting as protein stabiliser is a disodium or dispotassium phosphate and is present in quantities of 0.05 to 0.3% by weight with reference to the total weight of the emulsion.

7. A confectionery product according to claim 1, wherein the said modified starch is present in quantities of 0.1 to 1.5% by weight with reference to the total weight of the emulsion.

8. A confectionery product according to claim 1, in which the said modified starch is an acetate starch or a di-starch phosphate.

9. A confectionery product according to claim 1, having, in the liquid state, a viscosity of 50 to 250 cPs at 20° C. determined with a Brookfield RV2 DV2 plus viscosimeter with S1 rotating at 50 r.p.m.

10. A confectionery product according to claim 1, wherein the said emulsion is an oil-in-water emulsion.

11. A confectionery product according to claim 1, having a freezing temperature between −3 and −8° C.

12. A confectionery product according to claim 1, which after freezing in static conditions has a microcrystalline structure with crystals of average dimensions lying between $5\mu$ and $35\mu$ but not greater than $150\mu$.

13. A confectionery product according to claim 1, obtainable by means of the steps of:

a) preparation of an emulsion at a temperature of 50–65° C., comprising alimentary fats, milk proteins, sweeteners, stabilising and thickening agents and flavourings;

b) sterilisation of the emulsion at a temperature between 136 and 150° C. for a time of 15 to 0.5 seconds;

c) homogenisation of the sterilised emulsion at a temperature of 60 to 80° C. at a pressure of 70 to 200 bar;

d) cooling of the product and packaging in sterile conditions.

14. A confectionery product according to claim 1, wherein said hydrocolloid is selected from the group consisting of:

water soluble hemicellulose, pectins having a high degree of esterification, and mixtures thereof.

15. An ice-cream confectionery product in the form of an emulsion which is stable in a liquid state at ambient temperature, preservable at ambient temperature in said liquid state when packaged in sterile conditions and having a microcrystalline structure following freezing in the absence of beating, comprising alimentary fats, milk protein, sweeteners, flavourings and water, further comprising a thickening and stabilising composition comprising a salt acting as a protein stabiliser, a hydrocolloid constituted by a chemically modified starch and at least one hydrocolloid;

wherein said thickening and stabilizing component comprises:

a salt acting as a protein stabilizer, a hydrocolloid constituted by a chemically modified starch, and at least one further hydrocolloid consisting of a water soluble hemicellulose having an average molecular weight between 100,000 and 400,000 and which is a product obtainable by degradation of vegetable fibres containing proteins, not water-soluble in acid conditions.

* * * * *